United States Patent
Ha

(10) Patent No.: US 8,130,836 B2
(45) Date of Patent: Mar. 6, 2012

(54) MULTI-VIEW STEREO IMAGING SYSTEM AND COMPRESSION/DECOMPRESSION METHOD APPLIED THERETO

(75) Inventor: Tae-hyeun Ha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1461 days.

(21) Appl. No.: 11/431,014

(22) Filed: May 10, 2006

(65) Prior Publication Data

US 2006/0268987 A1    Nov. 30, 2006

(30) Foreign Application Priority Data

May 31, 2005   (KR) .............................. 2005-0046431

(51) Int. Cl.
*H04N 7/12* (2006.01)

(52) U.S. Cl. ......... 375/240.16; 348/42; 348/46; 348/47; 348/48; 348/51; 375/240.12; 375/240.01; 375/240.26

(58) Field of Classification Search .................... 348/42, 348/46–48, 51; 375/240.16, 240.12, 240.26, 375/240.01
See application file for complete search history.

(56) References Cited

U.S. PATENT DOCUMENTS

| 6,289,049 | B1  |   | 9/2001 | Kim et al. ................ 375/240.16 |
|-----------|-----|---|--------|----------------------------------------|
| 7,672,378 | B2  | * | 3/2010 | Ng et al. .................. 375/240.26 |
| 7,706,621 | B2  | * | 4/2010 | Sung et al. .................... 382/236 |
| 2004/0131120 | A1 |  | 7/2004 | Kim et al. ................ 375/240.16 |

FOREIGN PATENT DOCUMENTS

| JP | 10-191396 | 7/1998 |
| JP | 2004-048725 | 2/2004 |
| KR | 1020020032954 A | 5/2002 |
| KR | 1020030037140 A | 5/2003 |
| KR | 1020040065014 A | 7/2004 |
| KR | 1020050038054 A | 4/2005 |

* cited by examiner

*Primary Examiner* — Jay Patel
*Assistant Examiner* — Geepy Pe
(74) *Attorney, Agent, or Firm* — Roylance, Abrams, Berdo & Goodman, LLP

(57) ABSTRACT

A receiver and transmitter in a multi-view stereo imaging system and a compression method applied thereto are provided for increasing a compression rate of an image. A first, second, and third image is captured at the same time by a first, second, and third camera consecutively located at certain intervals. Data is encoded and transmitted for one of the first and third image, data regarding non-transmission of a residual image created, when the residual image is lower than the threshold value, and the residual image, when the residual image is higher than the threshold value. Thus, the compression rate is increased since data compressed for the second image is not transmitted at the time when a difference between an intermediate image and the second image is lower than the threshold value.

7 Claims, 5 Drawing Sheets

MULTI-VIEW STEREO IMAGING SYSTEM AND COMPRESSION/DECOMPRESSION METHOD APPLIED THERETO

CROSS-REFERENCE OF RELATED APPLICATIONS

This application claims the benefit under 35 U.S.C. §119 (a) of Korean Patent Application No. 2005-46431, filed on May 31, 2005, the entire disclosure of which is incorporated herein by reference.

BACKGROUND OF THE INVENTION

1. Field of the Invention

The present invention relates to a multi-view stereo imaging system and a compression/decompression method applied thereto. More particularly, the present invention relates to a multi-view stereo imaging system and a compression/decompression method applied thereto for transmitting, receiving, and decompressing compression-ratio-enhanced images.

2. Description of the Related Art

Studies are actively undertaken across the world on developing three-dimensional video technologies including multi-view video technologies, especially in the USA, Europe, and Japan. In Europe, in order to develop a new three-dimensional television (TV) to substitute for a high definition television (HDTV) and two-dimensional TV, the European Union carried out a joint project COST230 (1991-1996) for standardizations for three-dimensional TV-related devices, three-dimensional image signal encoding, and transmission technologies. As a result, the European Union developed the three-dimensional image display and image transmission service technologies. The Package for New Operational Autostereoscopic Multi-view systems (PANORAMA) (1991-2001) project of the Advisory Committee for Advanced Television Service (ACTS) is developing multi-view stereo imaging systems for the purpose of utilizing three-dimensional imaging remote display devices in communications, and is developing multi-view video-related technologies. Also, another three-dimensional technology-related project, the Advanced Three-Dimensional Television System Technologies (ATTEST) project by eight European organizations, such as Philips and HHI in 2002, is in progress for the purpose of developing three-dimensional TV systems. The ATTEST performs research with a goal for developing systems compatible with the present two-dimensional digital TV while enabling users to enjoy three-dimensional images by additionally sending three-dimensional depth information.

Japan is attempting to implement three-dimensional television sets through the high definition three-dimensional project (1997-2002). In order to solve the problems such as unnatural distance feelings of existing stereo-view TV and fatigue derived from long-hour TV watching, Japan attempted to develop a three-dimensional TV by utilizing special display technologies using a multi-view imaging method or holography. Japan also performed studies on three-dimensional display devices, three-dimensional imaging systems, stereo visions, and the like.

Currently, one transmission channel is limited to 6 MHz in the DTV standards adopting MPEG2, which corresponds to the compression capability of transmission of a sheet of HD-class image through a channel. In such a given channel environment, a limitation exists in the bandwidth when transmitting an HD-class stereo image, that is, two sheets of HD-class images. Also, the multi-view video compression requires a much broader bandwidth compared to the compression transmission of an existing single camera, so that a high-efficiency and high-compression-ratio compression method compared to a conventional method is required.

SUMMARY OF THE INVENTION

An aspect of embodiments of the present invention is to address at least the above problems and/or disadvantages and to provide at least the advantages described below. Accordingly, an aspect of embodiments of the present invention is to provide a multi-view stereo imaging system and a compression/decompression method applied thereto, capable of enhancing a compression ratio by preventing data for a substantial image from being transmitted, if a difference between an intermediate image and a substantial image is lower than a certain value. The intermediate image is created based on images captured by a first and third camera of consecutively neighboring first, second and third cameras, and the substantial image is captured by the second camera.

The foregoing and other objects and advantages of exemplary embodiments of the present invention are implemented by providing a compression method applied to a multi-view stereo imaging system receiving a first, second, and third image captured at substantially the same time by a first, second, and third camera consecutively located. A disparity vector, corresponding to a motion vector between the first and third image is estimated. An intermediate image is created comprising an intermediate value of the estimated disparity vector; creating a residual image created based on a difference between the intermediate image and the second image, and comparing the residual image with a threshold value. At least one of the first and third image, data regarding non-transmission of the residual image if the residual image is lower than the threshold value, and the residual image if the residual image is higher than the threshold value is encoded and transmitted.

For example, the disparity vector estimates the disparity vector over the first and third image by a block unit. The residual image is compared to the threshold value by calculating at least one of mean square error (MSE), sum of absolute difference (SAD), median absolute deviation (MAD), and peak signal-to-noise ratio (PSNR) based on a pixel value difference between the intermediate image and the second image, and a calculation result is compared to the threshold value.

Accordingly, an aspect of an exemplary embodiment of the present invention provides a decompression method applied to a multi-view stereo imaging system receiving a first, second, and third image respectively captured by a first, second, and third camera consecutively located. Compressed data for the first and third image are received, and the first and third image is decompressed. A determination is made as to whether to receive a residual image created based on a difference between an intermediate image and the second image, wherein the intermediate image is created based on a disparity vector corresponding to a motion vector estimated based on the first and third image. The intermediate image is decompressed as the second image by creating the intermediate image based on the decompressed first and third image, when the residual image is received, and the second image is decompressed by synthesizing the intermediate image and the transmitted residual image, when the residual image is not received.

Accordingly, another aspect of an exemplary embodiment of the present invention provides a compression and decompression method applied to a multi-view stereo imaging system receiving a first, second, and third image respectively captured at the same time by a first, second, and third camera consecutively located. A disparity vector corresponding to a motion vector between the first and third image is estimated. An intermediate image comprising an intermediate value of the estimated disparity vector is created. A residual image based on a difference between the intermediate image and the second image is created, and the residual image is compared to a threshold value. The first and third image is encoded and transmitted. Data relating to non-transmission of the residual image, when the residual image is lower than the threshold value, or the residual image, when the residual image is higher than the threshold value is encoded and transmitted. The transmitted first and third image is decompressed, and a determination is made as to whether to receive the residual image. The intermediate image is decompressed as the second image, by creating the intermediate image based on the decompressed first and third image when the residual image is received, and the second image is decompressed as the second image, by synthesizing the intermediate image and the transmitted residual image, when the residual image is not received.

Accordingly, a further aspect of an exemplary embodiment of the present invention provides a transmitter for a multi-view stereo imaging system receiving a first, second, and third image captured at the same time by a first, second, and third camera consecutively located. An estimation unit estimates a disparity vector corresponding to a motion vector between the first and third image. An intermediate image creation unit creates an intermediate image of the first and third image based on the estimated disparity vector. A comparison unit detects a residual image created based on a difference between the intermediate image and the second image, and determines whether to transmit the residual image by comparing the residual image with a threshold value. An encoding unit encodes the first and third image, and encodes one of the residual image or data regarding non-transmission of the residual image, depending on a comparison result of the residual image to the threshold value.

The comparison unit detects the residual image by calculating at least one of mean square error (MSE), sum of absolute difference (SAD), median absolute deviation (MAD), and peak signal-to-noise ratio (PSNR), based on a pixel value difference between the intermediate image and the second image.

The encoding unit encodes data for the residual image, when the residual image is higher than the threshold value, and encodes data regarding non-transmission of the residual image, when the residual image is lower than the threshold value.

The estimation unit estimates by a block unit the disparity vector over the first and third image.

Accordingly, another aspect of an exemplary embodiment of the present invention provides a receiver comprised in the multi-view stereo imaging system, in order to decompress a first, second, and third image captured by cameras consecutively located. A judgment unit determines whether to receive a residual image created based on a difference between an intermediate image and a second image, wherein the intermediate image is synthesized based on the first image and the third image. An intermediate image synthesis unit decompresses the first and third image, estimates a disparity vector corresponding to a motion vector between the first and third image, and creates an intermediate image of the first and third image based on the estimated disparity vector. A calculation unit decompresses the intermediate image as the second image, when the residual image is not received, and decompresses the second image by synthesizing the intermediate image and transmitted residual image, when the residual image is received.

Accordingly, another aspect of an exemplary embodiment of the present invention provides a multi-view stereo imaging system receiving a first, second, and third image captured at the same time by a first, second, and third camera consecutively located. An estimation unit estimates a disparity vector corresponding to a motion vector between the first and third image. An intermediate image creation unit creates an intermediate image of the first and third image based on the estimated disparity vector. A comparison unit detects a residual image created based on a difference between the intermediate image and the second image, and determines whether to transmit the residual image by comparing the residual image with a threshold value. An encoding unit encodes the first and third image, and encodes one of data for the residual image or data regarding non-transmission of the residual image, depending on a comparison result of the residual image to the threshold value. A judgment unit determines whether the residual image is received. An intermediate image synthesis unit decompresses the first and third image, estimates a disparity vector between the first and third image, and synthesizes an intermediate image of the first and third image, based on the estimated disparity vector between the first and third image. A calculation unit decompresses the intermediate image to the second image, when the residual image is not received, and decompresses the second image by synthesizing the intermediate image and transmitted data for the residual image, when the residual image is received.

BRIEF DESCRIPTION OF THE DRAWINGS

The above aspects and other objects, features, and advantages of certain exemplary embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
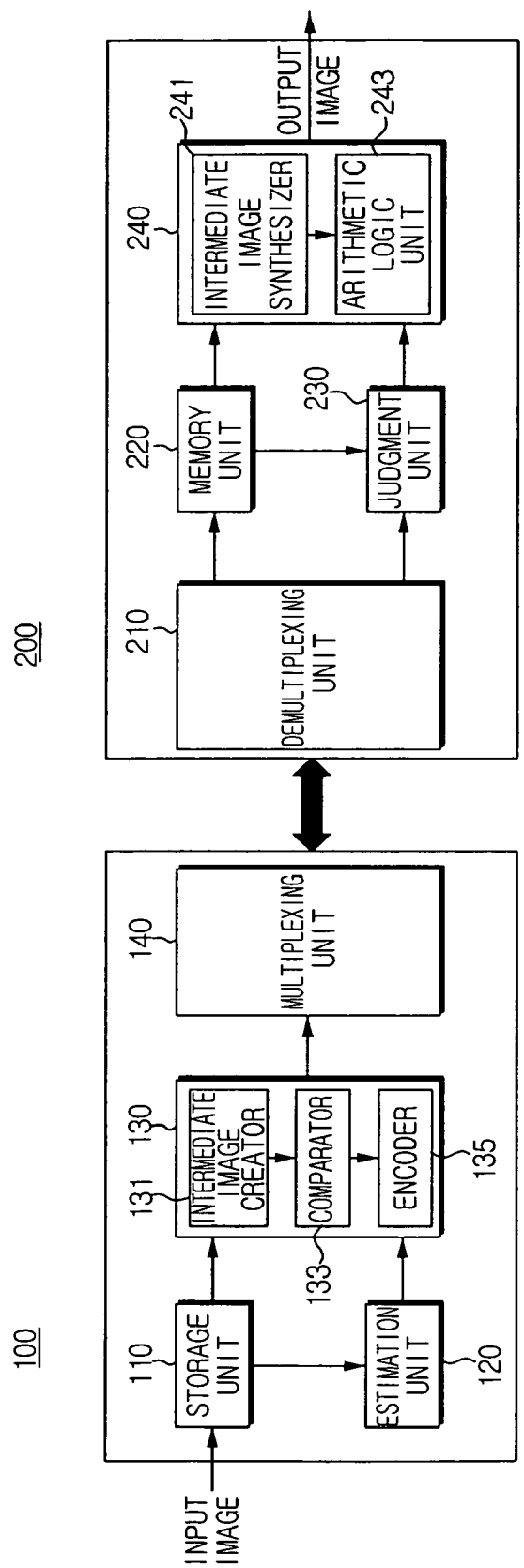
FIG. 1 is a block diagram for showing a multi-view stereo imaging system according to an exemplary embodiment of the invention.

FIG. 1 is a block diagram for showing a multi-view stereo imaging system according to an exemplary embodiment of the present invention.

In FIG. 1, the multi-view stereo imaging system according to an exemplary embodiment of the present invention comprises a transmitter 100 and receiver 200. The receiver 200 can be a multi-view television set, a three dimensional television (3D-TV), or a monitor.

The transmitter 100 includes a storage unit 110, estimation unit 120, compression unit 130, and multiplexing unit 140. The transmitter 100 receives a plurality of images captured by a plurality of cameras located at certain intervals. The storage unit 110 stores received images frame by frame.

The received images consist of a first, second and third image, respectively, captured by a first, second, and third camera consecutively located. Out of the stored images in the storage unit 110, the estimation unit 120 estimates a disparity vector corresponding to a motion vector between the first and third image. The first, second, and third image are images of a same object captured at substantially the same time by the first, second, and third camera. The first, second, and third image of the same object can also be captured as different images by the first, second, and third camera, due to different locations of the first, second, and third camera. Accordingly, the estimation unit 120 estimates the disparity vector corresponding to the motion vector between the first and third image created, due to the location difference between the first and third camera.

The disparity vector is estimated by a block unit. For example, the disparity vector is estimated by the 16×16 block unit, and also can be estimated by a block unit smaller than the 16×16 block unit.

The compression unit 130 includes an intermediate image creator 131, comparator 133, and encoder 135. The compression unit 130 compresses information relating to the first, second, and third image based on a difference value between a substantial second image and the second image synthesized according to the first and third image.

The intermediate image creator 131 creates an intermediate image based on the first and third image created from an intermediate image synthesis method. The intermediate image creator 131 creates an intermediate image by taking half the disparity vector value estimated by the estimation unit 120, and creates an intermediate image by the block unit used when the disparity vector is estimated. Accordingly, the disparity vector between the first image and the synthesized intermediate image is similar to the estimated disparity vector between the third image and the synthesized intermediate image, by the block unit.

The comparator 133 detects a residual image caused by the pixel value difference between the intermediate image synthesized by the intermediate image creator 131 and a substantial second image stored in the storage unit 110. The comparator 133 then compares the residual image to a threshold value. Calculation methods, such as, the MSE, SAD, MAD, PSNR, and the like, can be used for detecting the residual image. For example, when the MSE method is used, a sum of the pixel value difference between the synthesized intermediate image and the substantial second image is detected as a residual image.

The comparator 133 then compares the detected residual image and the threshold value, and determines whether to transmit data regarding the residual image. The threshold value is an experimental value that refers to a critical value in which image distortion can be avoided when a synthesized intermediate image is decompressed to the second image, since a pixel value difference between the synthesized intermediate image and the substantial second image is small.

The encoder 135 encodes either data of the residual image or data regarding non-transmission of the residual image, according to a comparison result of the residual image to the threshold value. If the residual image is higher than the threshold value, as a result of the comparison by the comparator 133, data for the residual image is encoded when the image data is compressed. On the other hand, if the residual image is lower than the threshold value, data regarding the non-transmission of the residual image is encoded when the image data is compressed. Accordingly, if the residual image is lower than the threshold value, the encoder 135 does not encode data for the entire residual image, but encodes the data for the residual image not transmitted to the receiver 200, thereby increasing a compression ratio.

The multiplexing unit 140 transmits individual bit streams, which are encoded, to the receiver 200 by performing multiplexing appropriate to a format of a bit stream transmission medium.

The receiver 200 has a demultiplexing unit 210, memory unit 220, judgment unit 230, and decompression unit 240. The receiver 200 receives data for images captured by the consecutively located cameras. The demultiplexing unit 210 splits the received data into individual bit streams, and outputs the split bit streams. The memory unit 220 stores the bit streams split by the demultiplexing unit 210.

In order to decompress the first, second, and third image captured by the first, second, and third camera consecutively located, the judgment unit 230 determines whether data for the residual image, created by the difference between the intermediate image and the substantial second image, is transmitted. Thus, the first and third image is used for synthesis of the intermediate image.

The decompression unit 240 includes an intermediate image synthesizer 241 and arithmetic logic unit 243. The decompression unit 240 decompresses the first, second, and third image by using a result from determining whether the data for the residual image is transmitted, and by using data for the image stored in the memory unit 220. Further, the decompression unit 240 decompresses the first and third image based on the data stored in the memory unit 220.

The intermediate image synthesizer 241 synthesizes the intermediate image by using the stored first and third image. The intermediate image synthesizer 241 estimates, by the block unit, a disparity vector corresponding to a motion vector between the first and third image over the decompressed image. The intermediate image synthesizer 241 then creates an intermediate image by taking half an estimated disparity vector value.

According to a result from the judgment unit 230, if data for the residual image is not transmitted, the arithmetic logic unit 243 decompresses the intermediate image, which is created by the intermediate image synthesizer 241, to a second image. However, if the data for the residual image is transmitted, the arithmetic logic unit 243 decompresses the second image by synthesizing the transmitted data for the residual image and the intermediate image created by the intermediate image synthesizer 241.

A description has been made relating to compressing information of the second image depending on whether a residual image is transmitted. The residual image is created based on a difference value between a substantial second image and an intermediate image created based on the first and third image.

When compressing a fourth image, a third, fourth, and fifth image is captured by a third, fourth, and fifth camera consecutively located. The method for compression into the second image is applied in the same manner to compress the third and fifth images into information relating to the fourth image. That is, for the even-numbered image captured by the even-numbered camera, the information on the even-numbered image is compressed and transmitted based on the neighboring odd-numbered images, so that a compression ratio can be increased.

Figure 2:
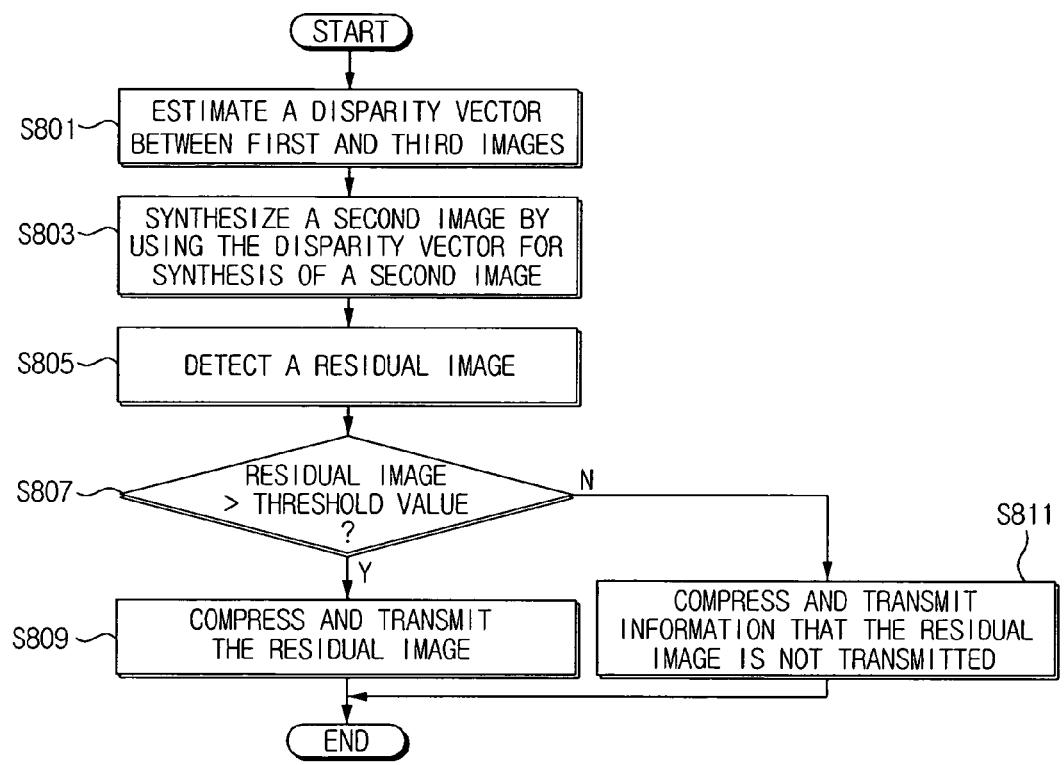
FIG. 2 is a flow chart for explaining a compression method applied to the multi-view stereo imaging system of FIG. 1.

FIG. 2 is a flowchart for explaining a compression method applied to the multi-view stereo imaging system of FIG. 1. Further, FIGS. 3A to 3C are illustrations for explaining FIG. 2 in detail.

Figure 3A:
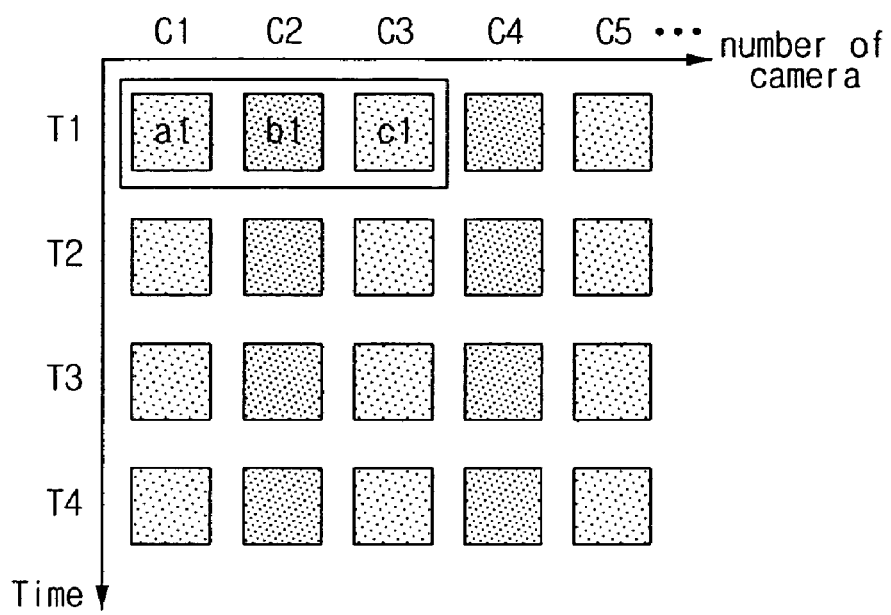
FIGS. 3A to 3C are illustrations for explaining in detail a compression method applied to a multi-view stereo imaging system according to an exemplary embodiment of the present invention.

In FIGS. 2 and 3A, when a plurality of cameras, located in a certain interval, capture images, in step S801, the multi-view stereo imaging system estimates a disparity vector corresponding to a motion vector between the first and third image, out of the first, second, and third image captured by the first, second, and third camera consecutively located. The disparity vector estimation is an estimate of the difference caused by the locations of the cameras between the images captured at the same time by the first and third camera relating to the same object.

FIG. 3A is an illustration for showing the images captured by a plurality of cameras located at certain intervals. FIG. 3A also shows camera numbers and image-captured times. In FIG. 3A, reference numerals C1, C2, and C3 denote the first, second, and third camera consecutively located, respectively. The first, second, and third image are denoted as image a1, image b1, and image c1, respectively. The first, second, and third image are images captured by cameras C1, C2, and C3 at the same time T1. Image a1, as the first image, and image c1, as the third image, are used for disparity vector estimation.

Figure 3B:
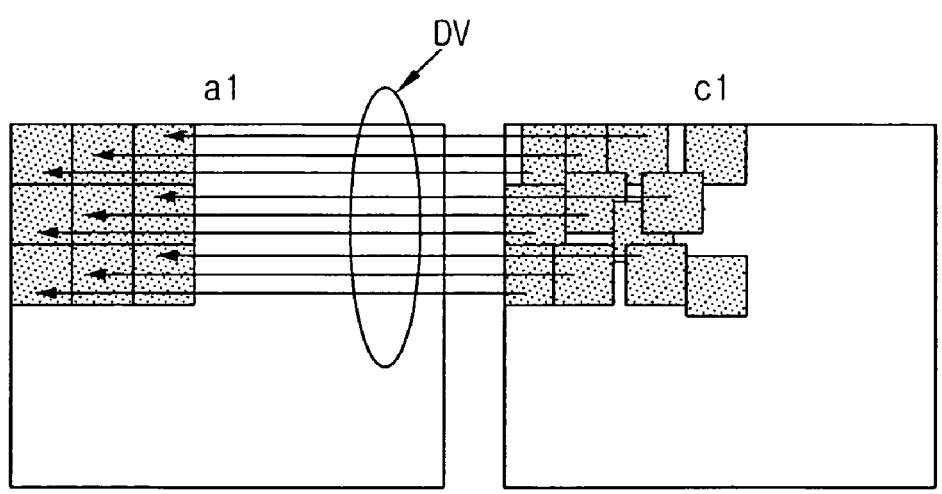
Figure 3C:
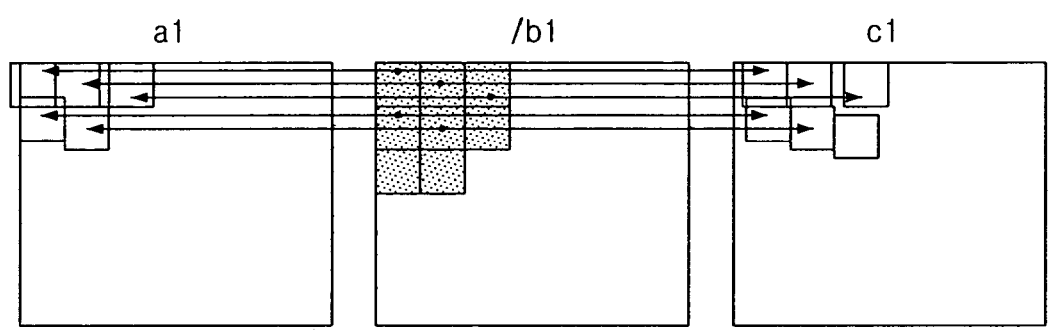

FIG. 3B is an illustration for showing the estimation for a disparity vector DV corresponding to a motion vector between images a1 and c1. In FIG. 3B, the disparity vector between the images a1 and c1 is estimated block by block. For example, a blocking size may be set to 16×16, and a disparity vector may be estimated by an 8×8 block unit or by the unit of blocks smaller than 8×8 blocks, depending on characteristics of an image.

Next, in step S803, the multi-view stereo imaging system synthesizes the second image by using the estimated disparity vector. In step S803, the second image is created by using an intermediate vector interpolation method based on a disparity vector between images a1 and c1.

FIG. 3C is an illustration for showing a method for creating an image /b1 as the second image synthesized based on the disparity vector between image a1, as the first image, and image c1, as the third image. The method shown in FIG. 3C can synthesize an intermediate image corresponding to an image captured by camera C2 by using a disparity vector. A disparity vector between images a1 and /b1 and a disparity vector between images /b1 and c1 correspond with a disparity vector between images a1 and c1, which can be expressed in Equation 1 below.

$$DV_{ab} = \frac{DV_{ac}}{2}$$
$$DV_{cb} = \frac{DV_{ac}}{2}$$

[Equation 1]

In Equation 1, $DV_{ab}$ denotes the disparity vector between images a1 and /b1, and $DV_{cb}$ denotes the disparity vector between images c1 and /b1. Further, $DV_{ac}$ denotes a disparity vector between images a1 and c1. As shown in Equation 1, the disparity vector between the images a1 and /b1 is half the disparity vector between images a1 and c1. Also, the disparity vector between images c1 and /b1 is also half the disparity vector between the images a1 and c1.

Accordingly, the method shown in FIG. 3C can synthesize the second image by taking half the disparity vector between images a1 and c1, which is an estimated disparity vector, and creates, by the block unit, the second image in which the disparity vector is estimated.

Next, in step S805, a residual image is detected, which is created based on a difference between the synthesized second image and the substantial second image. In step S805, a calculation method is used, such as, the MSE, SAD, MAD, PSNR, and the like, to obtain the residual image caused by the difference between the synthesized second image /b1 and the substantial second image b1 captured by camera C2. If the MSE is used to detect a residual image, the residual image can be expressed in Equation 2 below.

$$m = \sum_y \sum_x b1(x, y) - /b1(x, y)$$

[Equation 2]

In Equation 2, m denotes a residual image as a sum of pixel value differences between a synthesized second image and a substantial second image. Also, in Equation 2, b1 denotes the substantial second image; /b1 denotes the second image synthesized with image a1, as the first image, and image c1, as the third image; and x and y denote horizontal and vertical coordinates of the pixels in the image. As shown in Equation 2, if the MSE method is used, the residual image can be expressed as the sum of the pixel value differences between the synthesized second image and the substantial second image.

Next, in step S807, the residual image is compared to a threshold value. The threshold value is preferably determined by experimentation, and refers to a threshold value at which the residual image does not have to be taken into account due to a small difference between the substantial second image and the second image synthesized based on the first and third image. Further, the threshold value depends on a method, such as, MSE, SAD, MAD, PSNR, and the like, for obtaining residual images.

In step S809, when the residual image is higher than the threshold value, the residual image is transmitted, and data for the residual image is compressed and transmitted together with data for the first and third image. Accordingly, the receiver can decompress the second image by using the first, third, and residual images.

The residual image being lower than a threshold value can result when there is a significant image difference among the first, second, and third image, which are obtained in accordance with the same object at the same time, since cameras C1, C2, and C3 capturing the first, second, and third images are located apart from one another. For example, when an object is placed in a hidden area, the first, second, and third images can have a significant image difference therebetween. That is, when the object placed in the hidden area, the object may or may not be captured, depending on the locations of the cameras. As a result, the second image synthesized based on the first and third image can be quite different from the substantial second image.

Alternatively, in step S811, information relating to non-transmission of the residual image is transmitted, if the residual image is lower than the threshold value. The residual image is lower than the threshold value at the time the second image synthesized based on the first and third image has an insignificant difference compared to the substantial second image captured by the camera C2. As a result, an image distortion problem may not occur, even at a time when the first and third image is used for synthesizing the second image without the substantial second image transmitted to the receiver. Accordingly, when the residual image is lower than the threshold value, the information relating to the non-transmission of the residual image is transmitted to the receiver, rather than transmission of data for the residual image, so that a compression ratio of data for the image can be increased.

Figure 4:
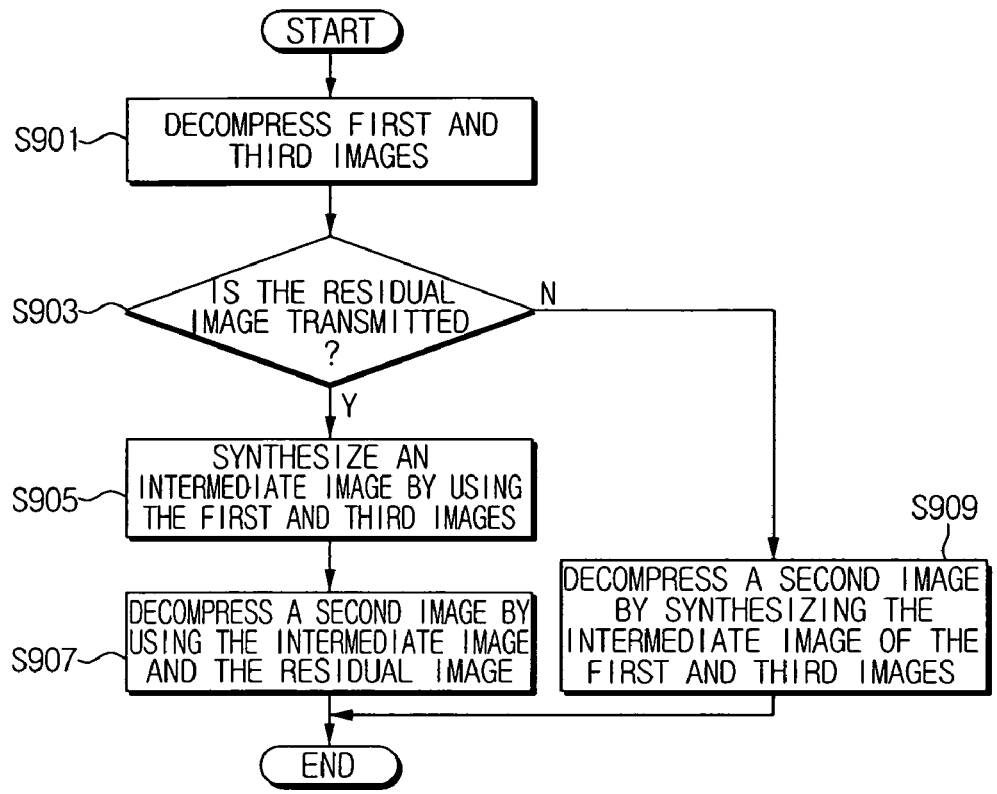
FIG. 4 is a flow chart for explaining a decompression method applied to a multi-view stereo imaging system of FIG. 1.
Figure 5:
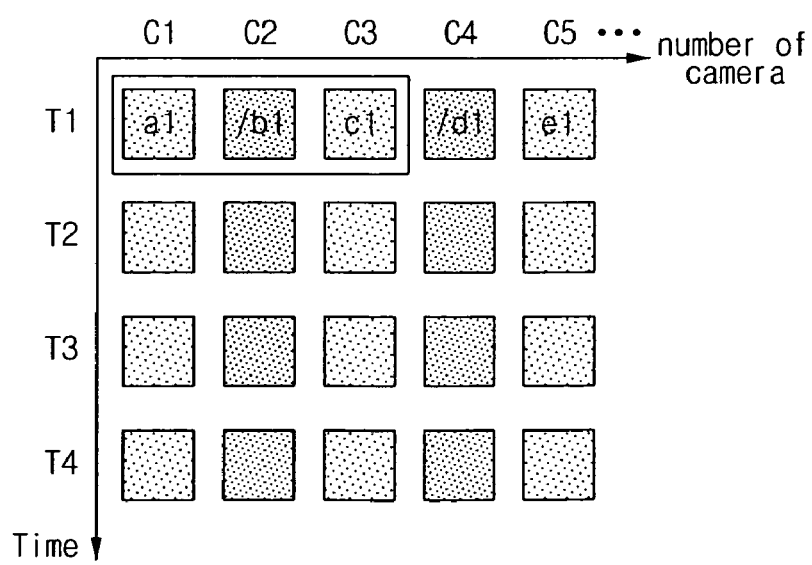
FIG. 5 is an illustration for explaining in detail a decompression method applied to a multi-view stereo imaging system according to an exemplary embodiment of the present invention.

FIG. 4 is a flowchart for explaining a decompression method applied to the multi-view stereo imaging system of FIG. 1, and FIG. 5 is an illustration for explaining FIG. 4 in detail.

In FIG. 4, the first and third image is decompressed by using the transmitted data, in step S901.

Next, in step S903, a determination is made as to whether a residual image is transmitted. Determination is made as to whether data regarding the non-transmission of the residual image is transmitted, or the residual image is transmitted. If the residual image is lower than the threshold value, the transmitter does not transmit data regarding the residual image, but transmits data regarding the non-transmission of the residual image.

If the residual image is transmitted, the first and third image decompressed in step S901 is used for synthesis of an intermediate image, in step S905. The intermediate image synthesis method is used to create an intermediate image corresponding to the second image based on the decompressed first and third image. In the same manner as the residual image compression process, a disparity vector corresponding to a motion vector between the decompressed first and third image is estimated block by block in step S905, and the intermediate image is created by taking half the estimated disparity vector.

Next, in step S907 the synthesized intermediate image and residual image is synthesized, and the second image is decompressed. In step S907, if the residual image is transmitted, the second image is decompressed by synthesizing the transmitted residual image and the synthesized intermediate image again, since image distortion can occur when the synthesized intermediate image is decompressed to the second image. That is, in step S907, the first and third image is used to synthesize the synthesized intermediate image and the residual image resulting from a difference between the intermediate image and the substantial second image, and the second image is decompressed.

On the other hand, if the residual image is not transmitted in step S903, the second image is decompressed by synthesizing an intermediate image based on the first and third image, in step S909. The residual image is not transmitted at the time when a difference between the substantial second image and an image synthesized by the intermediate image synthesis method, using the first and third image, is lower than the threshold value. Accordingly, in step S909, the synthesized image is decompressed as the second image.

FIG. 5 is an illustration for showing a sequence of images used for decompression of an image through intermediate image synthesis, sequence of images decompressed through the intermediate image synthesis over time, and camera numbers.

In FIG. 5, from a plurality of cameras located in predetermined intervals, camera C1 captures an image a1, camera C3 captures an image c1, and camera C5 captures an image e1. Data for images a1, c1, and e1 is received for decompression from the transmission, wherein cameras C1, C3, and C5 are odd-numbered cameras. However, an image captured by an even-numbered camera C2 is decompressed through synthesis of images a1 and c1 of the neighboring cameras, as an intermediate image. An image captured by an even-numbered camera C4 is decompressed through synthesis of images c1 and e1 of the neighboring cameras, as an intermediate image. Accordingly, from the images captured by the consecutively located cameras, the even-numbered images captured by the even-numbered cameras can be decompressed through the odd-numbered images captured by the odd-numbered cameras.

A compression rate of an input image may occasionally increase when using images, such as the first and fourth image captured by non-consecutively located cameras for compression and decompression of the second image, rather than the first and third image.

For example, when the fourth image is similar to the second image and not similar to the third image, a residual image between a synthesized image and the second image may be higher than the threshold value. The synthesized image is created based on the disparity vector between the first image and third image. Also, the residual image between the synthesized image and second image may be lower than the threshold value. Accordingly, the synthesized image is created based on the disparity vector between the first image and fourth image. When the second image is compressed based on the first image and third image, the residual image must be encoded. On the other hand, when the second image is compressed based on the first image and fourth image, data relating to the non-transmission of the residual image is transmitted so that a compression ratio can be increased.

As described above, exemplary embodiments of the present invention can increase a compression rate since data compressed for the second image is not transmitted at the time when a difference between an intermediate image and second image is lower than a certain value. The intermediate image is created through intermediate synthesis of the first, second, and third image, when compression occurs for the first, second, and third image respectively captured by the first, second, and third camera, which are consecutively located.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A compression method applied to a multi-view stereo imaging system, receiving first, second, and third images captured at substantially the same time by first, second, and third cameras that are consecutively located, the method comprising:

estimating a disparity vector corresponding to a motion vector between the first image and the third image;

creating an intermediate image comprising an intermediate value of the estimated disparity vector;

creating a residual image created based on a difference between the intermediate image and the second image;

comparing the residual image to a threshold value;

encoding and transmitting the first image, the third image and data regarding non-transmission of the residual image when the residual image is lower than the threshold value; and encoding and transmitting the first image, the third image and the residual image when the residual image is higher than the threshold value.

2. The method as claimed in claim 1, wherein the disparity vector is estimated over the first image and the third image by a block unit.

3. The method as claimed in claim 1, wherein the step of comparing the residual image with the threshold value calculates at least one of mean square error (MSE), sum of absolute difference (SAD), median absolute deviation (MAD), and peak signal-to noise-ratio (PSNR) based on a pixel value difference between the intermediate image and the second image, and compares a calculation result with the threshold value.

4. A transmitter comprised in a multi-view stereo imaging system, receiving first, second, and third images captured at the same time by first, second, and third cameras that are consecutively located, the system comprising:

an estimation unit for estimating a disparity vector corresponding to a motion vector between the first image and the third image;

an intermediate image creation unit for creating an intermediate image of the first image and the third image based on the estimated disparity vector;

a comparison unit for detecting a residual image created based on a difference between the intermediate image and second image, and determining whether to transmit the residual image by comparing the residual image with a threshold value; and an encoding unit for encoding the first image and the third image, and for encoding at least one of the residual image or data regarding non-transmission of the residual image, depending on a comparison result of the residual image to the threshold value;

wherein the first image, the third image and data regarding non-transmission of the residual image are encoded and transmitted when the residual image is lower than the threshold value; and wherein the first image, the third image and the residual image are encoded and transmitted when the residual image is higher than the threshold value.

5. The transmitter as claimed in claim 4, wherein the comparison unit detects the residual image by calculating at least one of MSE, SAD, MAD, and PSNR, based on a pixel value difference between the intermediate image and the second image.

6. The transmitter as claimed in claim 4, wherein the encoding unit encodes data for the residual image, when the residual image is higher than the threshold value, and encodes data relating to non-transmission of the residual image, when the residual image is lower than the threshold value.

7. The transmitter as claimed in claim 4, wherein the estimation unit estimates by a block unit the disparity vector over the first image and the third image.

* * * * *